(12) United States Patent
Bissoon et al.

(10) Patent No.: US 8,484,112 B2
(45) Date of Patent: Jul. 9, 2013

(54) FINANCIAL SYSTEMS AND METHODS FOR PROVIDING A CREDIT FACILITY TO INDIVIDUALS TO COVER PRE-AUTHORIZED CHARGES

(75) Inventors: Raj Bissoon, Pickering (CA); Donald Plumley, Oakville (CA)

(73) Assignees: American Bankers Insurance Company of Florida, Miami, FL (US); American Bankers Insurance Company of Florida, Toronto, Ontario (CA)

( * ) Notice: Subject to any disclaimer, the term of this patent is extended or adjusted under 35 U.S.C. 154(b) by 108 days.

(21) Appl. No.: 12/965,299

(22) Filed: Dec. 10, 2010

(65) Prior Publication Data

US 2012/0150567 A1 Jun. 14, 2012

(51) Int. Cl.
*G06Q 40/00* (2006.01)
(52) U.S. Cl.
USPC .................................................. 705/35; 705/4
(58) Field of Classification Search
USPC ................................................ 705/4, 35–40
See application file for complete search history.

(56) References Cited

U.S. PATENT DOCUMENTS 7,409,355 B1 * 8/2008 Guyan et al. ...................... 705/4
2006/0080144 A1 * 4/2006 Goel et al. ......................... 705/2

* cited by examiner

*Primary Examiner* — Thu Thao Havan
(74) *Attorney, Agent, or Firm* — Alston & Bird LLP (57) ABSTRACT

An apparatus for providing a credit facility to fund or cover preauthorized charges may include a processor and a non-transitory memory storing instructions. The instructions, responsive to execution, configure the processor to cause the apparatus at least to perform receiving information indicative of a user selection of at least one future payment commitment of the user, receiving an indication of user selected parameters corresponding to a coverage option entitling the user to receive a financial benefit to at least partially cover the at least one future payment commitment of the user in response to an occurrence of a qualifying event, determining a payment to be paid on behalf of the user to maintain the coverage option, and, in response to receiving an indication of the occurrence of the qualifying event, causing provision of the financial benefit to at least partially cover the at least one future payment commitment.

22 Claims, 6 Drawing Sheets

FINANCIAL SYSTEMS AND METHODS FOR PROVIDING A CREDIT FACILITY TO INDIVIDUALS TO COVER PRE-AUTHORIZED CHARGES

BACKGROUND

Certain jurisdictions have an extensive history of offering credit insurance programs through various financial institutions. In such jurisdictions, individuals typically pay a premium in exchange for insurance coverage that promises to pay insurance as a monthly sum in the event that the insured experiences a hardship brought on by any one of a number of named coverage losses such as death, disability or unemployment. The costs (called a "premium") for the coverage are usually charged monthly, and are calculated as a percentage of the outstanding balance.

Creditor insurance is usually available as part of a group insurance policy rather than an individual policy, where either the borrower or the financial institution is the owner and beneficiary of the group policy. The borrower is known as the insured. Creditor insurance can be a low-cost, convenient way of providing insurance coverage to individuals. Creditor insurance is distributed through financial institutions, auto dealers, mortgage brokers and lending institutions. Enrollment is typically voluntary and is most often made available at the time you enter your credit granting or leasing agreement.

In most cases, creditor insurance products cover the minimum monthly outstanding balance. Some insurance companies and financial institutions have attempted to enhance the value proposition by offering benefits beyond a minimum monthly benefit or the outstanding credit balance associated with a credit facility. However, no approved creditor insurance product has attempted to provide individuals with the benefit to fund future payment commitments, but instead such products only cover existing debt commitments.

Additionally, the lack of control and ability to customize coverage to suit the individual's situation is a limitation of creditor insurance. Individuals may not fully benefit from a "one size fits all" type product solution. Some individual may recognize a credit risk in other areas beyond credit card debts, and thus the individual may be more concerned with other non-discretionary payment obligations or commitments. In part, the inherent lack of choices and concerns with the perceived individual value has lead to some level of scrutiny of these products from various regulatory bodies and individual advocacy groups.

BRIEF SUMMARY OF VARIOUS EMBODIMENTS

Example embodiments of the present disclosure may provide a product that gives an individual flexible coverage options for providing, in case a covered event occurs, a benefit for the individual to at least partially cover or fund future payment commitments. The product is comprised of both credit granting elements, which may be offered by a financial institution or other credit grantor, and insurance elements, which may be offered by an insurer.

In an example embodiment, a method for providing a credit facility to at least partially cover or fund preauthorized charges is provided. The method may include receiving information indicative of a user selection of at least one future payment commitment of the user, receiving an indication of user selected parameters corresponding to a coverage option entitling the user to receive a financial benefit to at least partially cover the at least one future payment commitment of the user in response to an occurrence of a qualifying event, determining a payment to be paid on behalf of the user to maintain the coverage option, and, in response to receiving an indication of the occurrence of the qualifying event, causing provision of the financial benefit to at least partially cover the at least one future payment commitment.

In another example embodiment, apparatus for providing a credit facility to at least partially cover or fund preauthorized charges is provided. The apparatus may include a processor and a non-transitory memory storing instructions. The instructions, responsive to execution, configure the processor to cause the apparatus at least to perform receiving information indicative of a user selection of at least one future payment commitment of the user, receiving an indication of user selected parameters corresponding to a coverage option entitling the user to receive a financial benefit to at least partially cover the at least one future payment commitment of the user in response to an occurrence of a qualifying event, determining a payment to be paid on behalf of the user to maintain the coverage option, and, in response to receiving an indication of the occurrence of the qualifying event, causing provision of the financial benefit to at least partially cover the at least one future payment commitment.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

Brief Overview

Disclosed are various systems and methods for creating and implementing a funded preauthorized payment protection product that provides individuals with insurance coverage to meet their short-term recurring payment commitments (e.g., credit card payments, auto payments, utilities and mortgage payments) in which the individual is assisted through repayments that are made in response to the occurrence of a covered loss. In various embodiments, the plan is set up to allow for the creation of an ongoing credit facility where the individual derives a benefit from the financial institution or credit grantor—i.e. to prepay the preauthorized payment commitments on behalf of the individual. That is, some example embodiments may provide for prefunding these payments during a specific period regardless of whether the individual has available funds, at time of payment, to cover the recurring payment commitments.

In particular embodiments, the individual may pay interest on any outstanding amounts advanced by the financial institution or credit grantor, on behalf of the customer, at a predefined interest rate. This interest may be at market rates, or at submarket interest rates (e.g. percentage discount). In other embodiments, the individual pays no interest on any funds advanced on behalf of the financial institution or credit grantor.

In various embodiments, the individual pays a fee, which may be seen as a premium fee in embodiments structured according to an insurance model, for the coverage. A product according to an example embodiment protects the individual's recurring payment obligations or commitments by funding or covering (at least partially) those payments when the individual is unable to service those payments due to loss of income brought about by total disability, loss of employment, hospitalization or any other event covered by the product. Several product variations may be offered. One variation utilizes a limited line of credit financial instrument for collection of premium or fees and processing payment of benefits and the second utilizes a credit card as the tool for collection of premium or fees and payment of benefits.

There is a large constituency of individuals that pay their mortgage, rental, auto, utility, and financial services commitments via pre-authorized payment (e.g., automatic bill-payment services) and a product composition according to an example embodiment may protect those pre-authorized payments at a time of loss. In particular embodiments, a computer system may be used to facilitate the enrollment into the plan. The computer system may, for example, be adapted to calculate the appropriate premiums for the plan based, at least in part, on such factor as the individual's specific election of the amount of coverage expected to be needed. In various embodiments, the computer system tracks the accumulation of payouts and the amount to be paid back from the individual from the time of the first payout to the full collection of the amounts to be settled at the end of the month (i.e. tracking each payment).

In an example embodiment, the computer system may be configured for: (A) storing, within the system's memory, the set up of the individual's product profile—i.e. product coverage. This may include the policy information indicating that a particular individual holds a policy that provides the particular individual with a generic or specific coverage option(s) to, upon the occurrence of a qualifying event, receive a payment benefit; (B) to set up a credit facility (e.g. a form of revolving loan or line of credit limited to funding or covering pre-authorized charges against a financial institution or credit grantor account) to checking/savings accountholders or credit card under which all recurring pre-authorized payments up to a set aggregate limit will be covered as occurred by the financial institution or credit grantor with the aggregate of such amounts being collected via debit from the individual's credit facility (e.g. bank account or credit card) on the last day of the month (C) to tag and track the payment amounts for each recurring payment commitment, (D) to apply a premium charge against the total preauthorized recurring payment commitment, (E) to receive data indicating that the qualifying claims loss has occurred; and (F) to process of a claim repayment on the individual's behalf to service the outstanding debt commitment.

In another example embodiment, the product may be design to provide the following credit facility as follows including: (1) the financial institution or credit grantor may offer a credit facility (e.g. a revolving loan or limited line of credit or credit card); (2) the financial institution or credit grantor may fund or cover (at least partially) all recurring pre-authorized payments up to a set aggregate limit. That is, the financial institution may fund or cover each payment commitment as occurred with the aggregate of such amounts being collected via debit from the individual's credit facility on the last financial institution or credit grantor day of the month.

In some examples, the set up of the credit facility serves to establish the debt commitment to the financial institution or credit grantor. The creation of this debt commitment allows for this product solution to be categorized as an approved credit insurance product, thus allowing financial institutions the opportunity to market the product in a non insurance licensed model.

In certain embodiments, the computer system may be configured to receive, from the financial institution or credit grantor, coverage details such as: (A) premium generated for current period; (B) the amount the individual spent on pre-authorized charges; (C) status of the account or card holder; and (D) individual cancellation request.

In various embodiments, the qualifying event may be one or more of the following including: (A) the disability of the individual (e.g., the policy holder); (B) the involuntary unemployment of the individual; or (C) the hospitalization of the individual.

In some embodiments, the coverage option or policy may be an insurance policy under which: (1) in response to an occurrence of the qualifying loss, a benefit would be payable to the financial institution (the creditor) and be applied against the full or partial actual month-end debt owed under the credit facility based upon pre-authorized charges already established at time of enrollment into the program (up to a set aggregate limit).

In some embodiments, the computer system may be configured to allow the individual (which, as noted above, is the policy holder) to schedule a recurring payment commitment based on the qualifying loss. The policy holder may be defined as the primary account or card holder.

Generally speaking, the term financial institution is used herein as an example of a credit grantor. Thus, it should be appreciated that example embodiments are not limited to application with financial institutions, but instead with any entity capable of granting credit to a consumer in any form. Moreover, although an example embodiment will be described in the context of an insurance policy, it should be appreciated that coverage under example embodiments may not necessarily coincide with an insurance product in some embodiments. Thus, example embodiments may be employed in connection with a debt deferment product or other non-insurance related product as well. It should also be appreciated that the future payment obligations or commitments described herein may be completely voluntary in some cases. Thus, for example, the future payment commitments referred to herein could correspond to payments to fund or cover a savings plan of some sort (e.g., retirement account, college savings account, etc.) or other discretionary expenditures that the consumer would prefer to fund or cover, even if of one of the covered events should occur.

System Architecture

Figure 1:
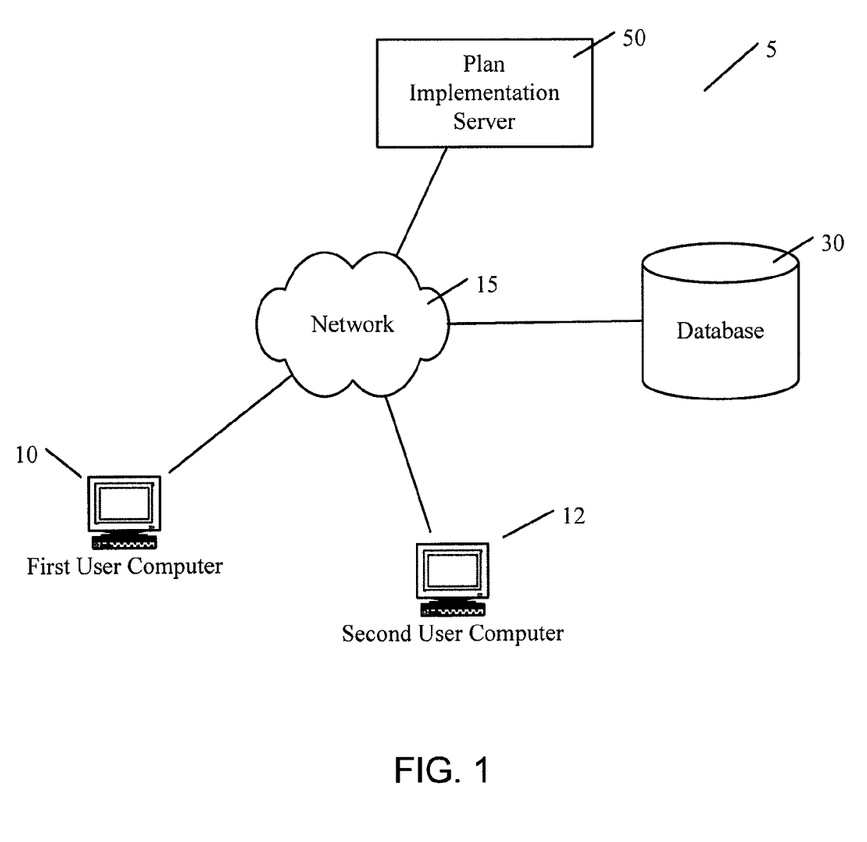
FIG. 1 is a block diagram of a Plan Implementation System according to an example embodiment.

In various embodiments, a Plan Implementation Computer System 5 is used to implement the funding assurance plan. One embodiment of a suitable Plan Implementation Computer System 5 is shown in FIG. 1. As may be understood from this figure, in this embodiment, the system 5 includes one or more user computers 10, 12 that are connected, via a network 15 (e.g., a LAN or the Internet), to communicate with a Plan Implementation Server 50. In one example embodiment, the first user computer 10 may be a computer associated with a customer and the second user computer 12 may be a computer associated with a bank or insurance company. In one embodiment of the invention, the plan implementation system 5 is configured for retrieving data from and storing data to a database 30 that may be stored on (or, alternatively, stored remotely from) the Plan Implementation Server 50.

In an example embodiment, either or both of the first user computer 10 and the second user computer 12 may be a personal computer (PC) or a laptop computer associated with a particular individual or organization. However, in other cases, either or both of the either or both of the first user computer 10 and the second user computer 12 may be a personal digital assistant (PDA), a point of sale (POS) terminal, an automated teller machine (ATM), or a client terminal associated with a financial institution or other entity capable of granting credit or issuing a credit facility such as a bank, or with an insurance provider or other entity. As such, in some cases, the first user computer 10 or second user computer 12 may represent a terminal for providing user interface with the system 5. In some cases, middleware associated with a particular financial institution may be provided between a computer associated with a financial institution and the Plan Implementation Server 50 to enable the Plan Implementation Server 50 to interface with different input terminals.

It should be appreciated that FIG. 1 illustrates one example architecture for the Plan Implementation Computer System 5, and numerous other architectures could be equally applicable to various example embodiments. Thus, for example, some embodiments may include additional components, fewer components, or different components than those illustrated in FIG. 1. Generally speaking, the Plan Implementation Computer System 5 may be configured to enable prequalification of an individual, capture data to enroll the individual, trigger the setup of a credit facility or document a pre-existing credit facility for payment tracking and processing, retrieve data from and store data to the database 30, and perform other functionalities described herein.

Figure 2:
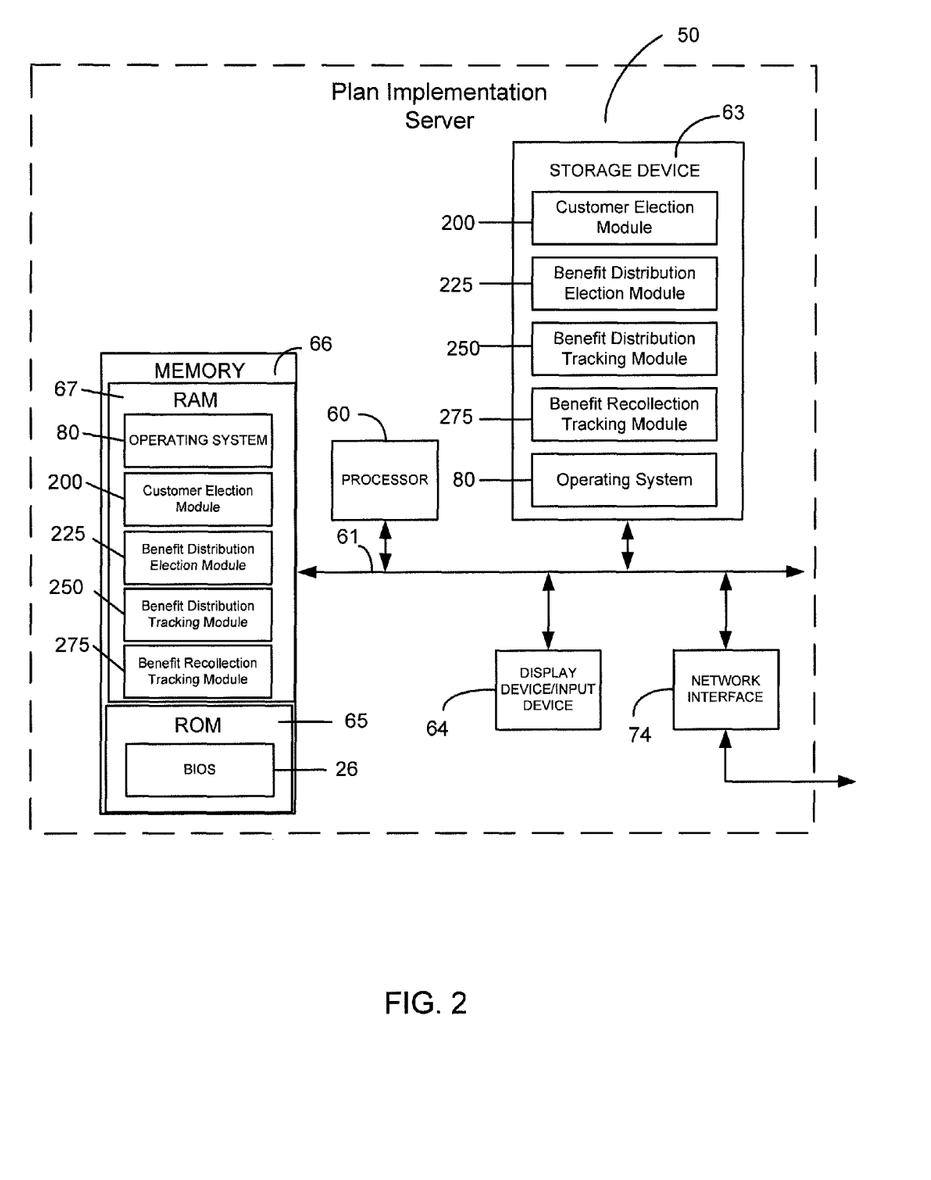
FIG. 2 is a schematic diagram of a Plan Implementation Server according to one example embodiment.

FIG. 2 shows a schematic diagram of the Plan Implementation Server 50 according to one embodiment of the invention. The Plan Implementation Server 50 includes a processor 60 that communicates with other elements within the Plan Implementation Server 50 via a system interface or bus 61. Also included in the Plan Implementation Server 50 is a display device/input device 64 for receiving and displaying data. This display device/input device 64 may be, for example, a keyboard or pointing device that is used in combination with a monitor. The Plan Implementation Server 50 further includes memory 66, which may include both read only memory (ROM) 65 and random access memory (RAM) 67. The server's ROM 65 may be used to store a basic input/output system 26 (BIOS), containing the basic routines that help to transfer information between elements within the Plan Implementation Server 50.

In addition, the Plan Implementation Server 50 includes at least one storage device 63, such as a hard disk drive, a floppy disk drive, a CD Rom drive, or optical disk drive, for storing information on various non-transitory computer-readable media, such as a hard disk, a removable magnetic disk, or a CD-ROM disk. As will be appreciated by one of ordinary skill in the art, each of these storage devices 63 may be connected to the system bus 61 by an appropriate interface. The storage devices 63 and their associated computer-readable media provide nonvolatile storage for a personal computer. It is important to note that the computer-readable media described above could be replaced by any other type of non-transitory computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a Customer Election Module 200, a Benefit Distribution Election Module 225, a Benefit Distribution Tracking Module 250, and a Benefit Recollection Tracking Module 275. The Customer Election Module 200, the Benefit Distribution Election Module 225, the Benefit Distribution Tracking Module 250, and the Benefit Recollection Tracking Module 275 may control certain aspects of the operation of the Plan Implementation Server 50, as is described in more detail below, with the assistance of the processor 60 and the operating system 80.

Also located within the Plan Implementation Server 50 is a network interface 74, for interfacing and communicating with other elements of a computer network. It will be appreciated by one of ordinary skill in the art that one or more of the Plan Implementation Server 50 components may be located geographically remotely from other Plan Implementation Server 50 components. Furthermore, one or more of the components may be combined, and additional components performing functions described herein may be included in the Plan Implementation Server 50.

Figure 3:
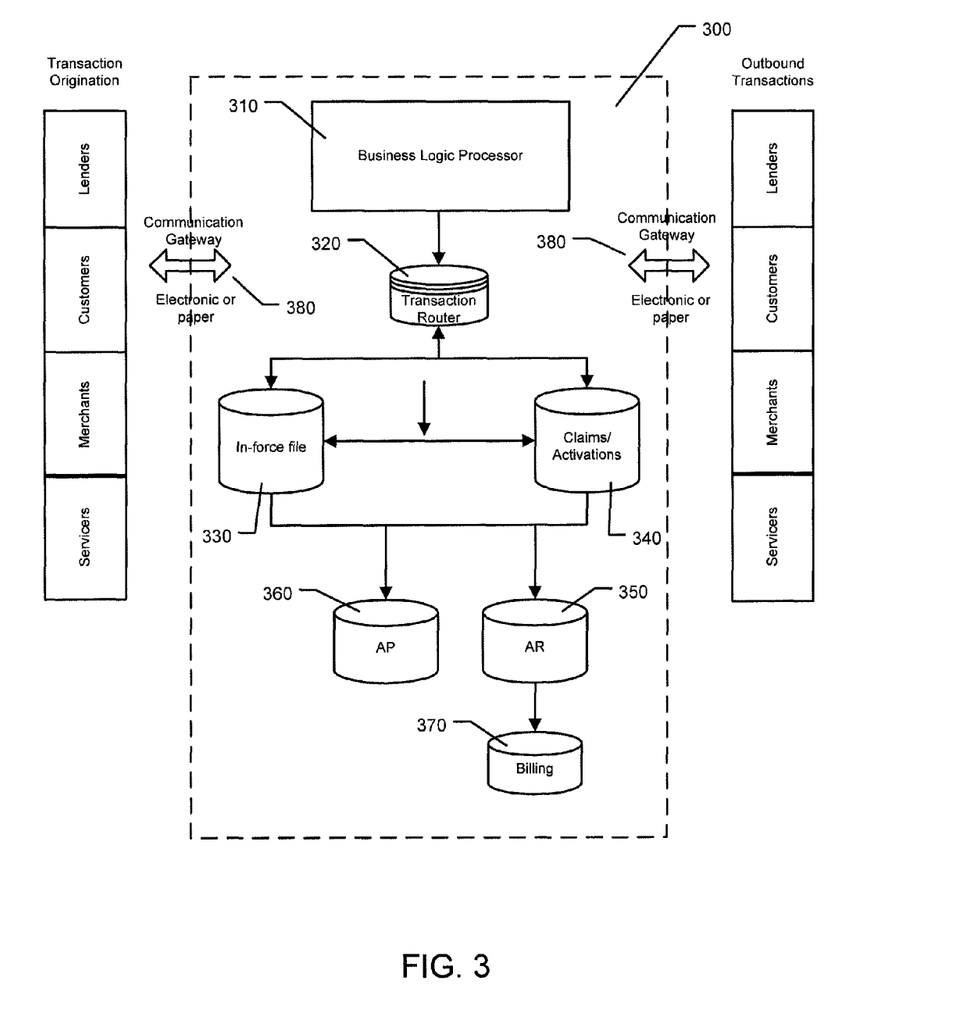
FIG. 3 is a block diagram of a Plan Implementation System according to a further example embodiment.

Another embodiment of a plan implementation system is shown in FIG. 3. In this embodiment, the Plan Implementation System 300 includes a Business Logic Processor 310 that is adapted for receiving and processing transaction information, and for passing the information to a Transaction Router 320, which routes information regarding the transaction to various other components of the system 300 for processing. The system 300 further includes an In-Force File 330, which may be, for example, a database or file that stores a listing of plans/policies that are currently in force. The system 300 further includes a Claims/Activations Server 340 that is configured for processing activations of new plans/policies, and for processing claims filed under those policies.

In some example embodiments, the system 300 also includes an Accounts Receivable Server 350 and a Billing Server 370, which are configured, respectively, to handle accounts receivable information and to process bills. In addition, the system 300 includes an Accounts Payable Server 360 for handling accounts payable.

In some example embodiments, the system 300 also includes a communication gateway 380 that may be configured to facilitate communications between the system 300 and, for example, servicers, merchants, customers, and lenders. The communication gateway 380 may, for example, be configured to handle the following types of inbound transactions and information: (1) new enrollments; (2) information regarding new insureds; (3) customer loan information; (4) customer instructions on cash disbursements; (5) billing transactions; and (6) debt history information. The communication gateway 380 may, for example, be configured to handle the following types of outbound transactions and information: (1) fulfillment package information; (2) requests for benefit communications; (3) payments; (4) billing; and (5) customer service communications.

More Detailed Discussion of Various Embodiments

Various embodiments of the invention are described in greater detail below. The embodiments hereafter are merely non-limiting examples and generally relate to such topics as insurance policy set up and claims processing. Insurance policy set up may include setup of a group insurance policy to cover various events, including disability, hospitalization and loss of employment, and setup by a financial institution of a credit facility (e.g., a form of revolving loan or limited line of credit that may be limited to covering or funding pre-authorized recurring payments) to checking/savings account holders or credit card holders under which all recurring pre-authorized payments up to a set aggregate limit will be funded or covered as occurred, with the aggregate of such amounts being collected via a debit from the individual's credit facility on the last day of the month or at some other predefined date (as defined in the insurance certificate document).

Insurance Policy Setup

In an example embodiment, an individual may pay a premium fee (e.g. monthly premium charge) for an insurance certificate in which an insurance company agrees to provide payments directly to a financial institution (i.e. creditor) in the event that the individual experiences a covered loss such as, for example: (1) the unemployment of a specified individual; (2) the disability of a specified individual; or (3) the hospitalization of a specified individual, as specified in the group master policy. The repayments made to the financial institution may be provided for covering one or more (specific or general) future payment commitments of the user (or insured). As such, the user may be provided with insurance to cover future payment commitments in the event that a covered loss occurs. Accordingly, the insurance product is not insuring payments on a debt of the user, but rather coverage against the repayment of the preauthorized payments made on behalf of the customer by the credit grantor. These future payments may relate to services the user receives for example from (e.g., cell phone service providers, Internet service providers, cable companies, utility companies, membership-based organizations, insurance companies, investment companies, and/or the like).

Figure 4:
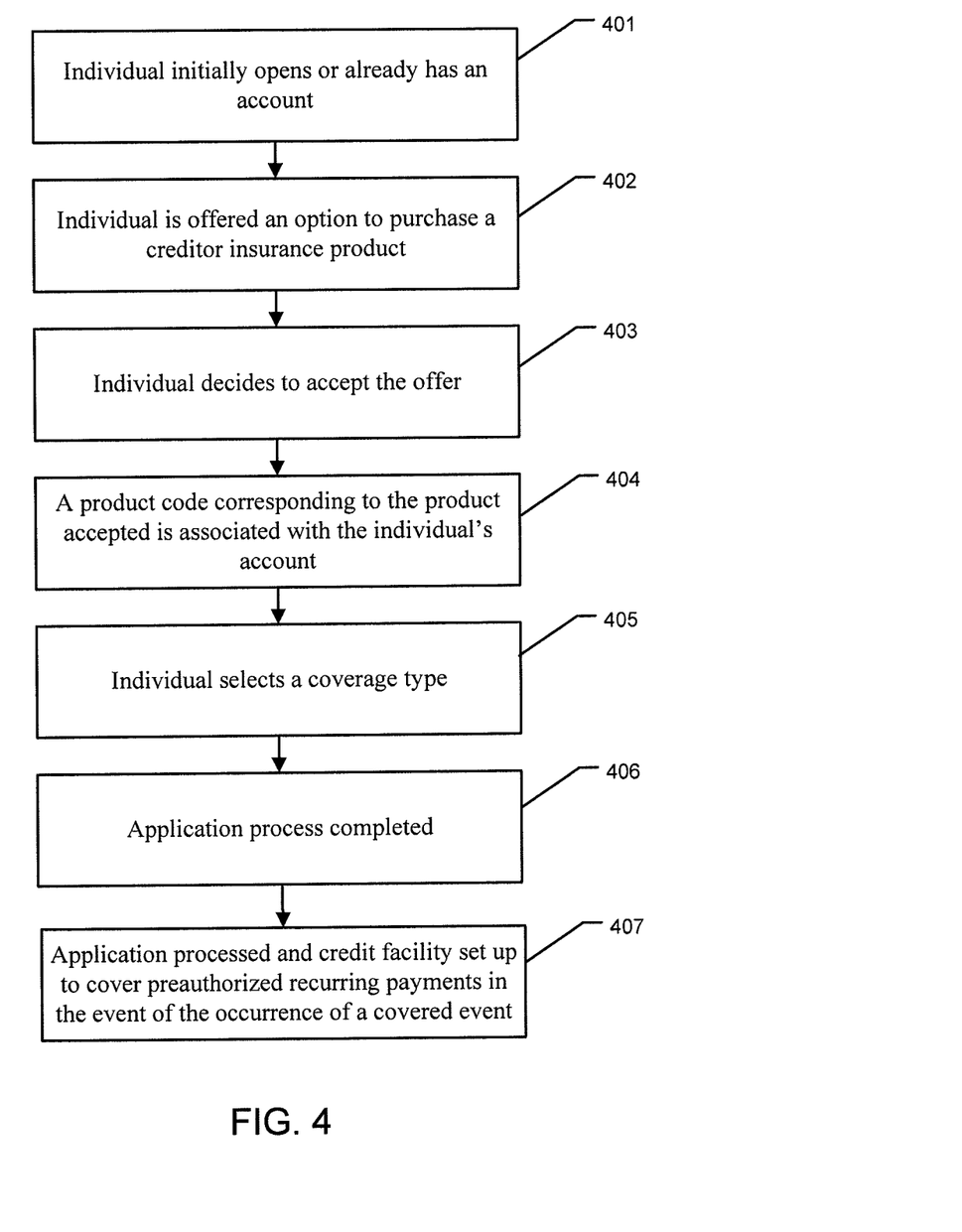
FIG. 4 is a flow chart illustrating operations associated with the setup of an insurance plan to cover preauthorized payments in the event of a covered loss according to an example embodiment.

The various exemplary operations associated with this example embodiment are shown in FIG. 4. It should be appreciated that the operations described in connection with FIG. 4 may be performed by or in connection with the system 5 of FIG. 1. As shown in FIG. 4, an individual may initially open or already have an account (e.g., a checking account, credit card account, etc.) at operation 401. At operation 402, the individual may be offered an option to purchase a creditor insurance product according to an example embodiment. The offer may be made by a financial institution. In some embodiments, the financial institution may offer a credit facility (e.g., a form of revolving loan or limited line of credit limited to fund or cover pre-authorized charges). The credit facility may remain available so long as the financial institution is able to collect the funds advanced to the individual as per the agreement established by virtue of the individual accepting the offer and completing an application that is approved by the financial institution. In some cases, interest or financial institution fees may be charged in respect of the credit facility, as described in greater detail below. In an example embodiment, the credit facility will be used exclusively to fund or cover the individual's recurring pre-authorized payments that are covered by the product. In some cases, there may be a limit to the amount of coverage that can be provided and that limit may be determined by the financial institution (e.g., up to an aggregate limit of $2,000 per month or some other suitable value).

At operation 403, the individual may make a decision as to whether to accept the offer. If the offer is accepted, a product code corresponding to the product accepted may be associated with the individual's account at operation 404. Additionally, beginning at operation 405, the individual may have the option to select a coverage type. Generally speaking, example embodiments may provide coverage for future payment commitments (i.e., preauthorized payments) including commitments at the date of loss. As such, the selection of a coverage type may relate to selection of a fixed fee product or selection of a variable option. The variable option may cover all eligible preauthorized recurring payments (or at least those eligible preauthorized payments that have been selected by the individual for coverage), whereas, the "fix fee" product may cover the individual for a specific amount of coverage (for example: $1,000). Thus, for example, the individual will be eligible to make a claim to cover their preauthorized recurring payment commitments up to a maximum of $1,000 in the above described fixed fee example, but would be eligible to make a claim to cover the specific preauthorized recurring payment commitments specified by the individual during coverage type selection if the variable option was selected. In the fixed fee example, if the total amount of preauthorized payments that need covering is less than the fixed fee coverage amount, then the total amount is covered and not the maximum amount.

For the variable option, each preauthorized payment that is to be covered by the product may be tagged. In some embodiments, a customer profile may be set up that identifies the specific preauthorized payments that the individual desires to be covered by the product. In some cases, the individual may tag specific preauthorized payments by providing a transaction code to identify the preauthorized payments that are to be covered by the product.

The individual may thereafter complete the application process at operation 406 by providing any further information, authorizations and/or signatures that may be required to complete the application. The bank, financial institution or insurance company providing the insurance product may then process the application and set up a credit facility as described herein to cover the preauthorized recurring payments in the event of the occurrence of one of the covered events at operation 407.

In an example embodiment, the credit facility that is set up may provide that certain preauthorized payments (i.e., those covered in by the insurance) will be advanced by the financial institution until a predetermined time (e.g., end of the month) at which time the individual will pay the amount advanced back to the bank (e.g., automatically debited from an account registered with the product). This establishes a paradigm by which a debt relationship is established between the individual and the financial institution with respect to the preauthorized payments. As indicated above, the individual may have otherwise had the preauthorized payments already set up for automatic payment by the financial institution in some cases. Thus, the credit facility may act to establish a debt relationship to create a paradigm via which the insurance provided with respect to the preauthorized payments is provided in association with a debt owed by the insured to the financial institution.

In some embodiments, the financial institution may set up the credit facility to cause automatic payment of the tagged items on behalf of the individual throughout the month. In some cases, the bank may then debit an account of the individual at the end of the month (or at some other period) in the amount of all of the preauthorized payments that were made on behalf of the individual during the period. As an example, on the last day of the month (or at the end of the predetermined time period if it is not the end of the month), the aggregate of the payments will be collected from the individual along with the premium for the program fee (which may be based on the total of the monthly payments protected or a fix fee as indicated above). In the event of a claim, the premium may be waived during the claim period.

In an example embodiment, the individual pays a premium fee for the insurance coverage in which the insurance company promises to act as the guarantor for the individual on the revolving credit facility in the event that the individual experiences a covered loss such as, for example: (1) the unemployment of a specified individual; (2) the disability of a specified individual; or (3) hospitalization of a specified individual, as specified in the insurance certificate. In the event of a claim, the individual's credit facility will be credited on a monthly basis for the total pre-authorized charges (i.e. to the loan, limited line of credit account or credit card) for an amount less than or equal to the actual total amount incurred, which may be reflected on the previous statement prior to the date of loss. In some cases, the monthly premium that is charged may be a fixed amount, or may be based on a price per $100 of payments, for ease of calculation. In some embodiments, there may be a limited number of monthly benefit payments, and a maximum total or aggregate payment amount that the individual may receive under the policy. For example, there may be a maximum of six monthly payments of benefits and an aggregate maximum of $12,000 for all benefit payments. For multiple claims, any benefit paid for an insured individual under any one of the defined coverages may not be paid under another covered loss for the same cause. If an insured individual is eligible concurrently for a benefit payable for more than one insured loss, the benefit paid may be limited to the most generous one. The insured individual may therefore be entitled to only one benefit at a time.

Although a straight forward example has been described above, there may be many modifications made in some embodiments to enhance or alter the characteristics of the product in order to tailor it to have characteristics that may make it more marketable to the needs of individuals and financial institutions. For example, in some cases the bank may provide overdraft protection. In some embodiments, the money that is provided by the financial institution to cover the preauthorized payments may be provided free of interest until the end of the month (or other period). However, in some embodiments, the financial institution may charge interest on the borrowed money. In some cases, the user may be unable to or elect not to pay all or a portion of the amount provided by the financial institution to cover the preauthorized payments for the corresponding period. In these cases, the product may allow for the financial institution to extend credit to the individual and charge interest on the amount that is unpaid. In an example embodiment, the amount of interest charged on an unpaid balance at the end of a corresponding period (e.g., end of the month) may be more than that which is charged during the covered period (if any interest is charged during that period). Moreover, in some cases, the credit extension may be provided (automatically or at the request of the individual) for a specified period of time (e.g., 5 days, 15 days, 30 days etc.) with corresponding graduated interest rates that correspond to each respective period of time. Balances on amounts not settled at the end of each month (or other period) may be carried forward with the corresponding interest rates defined for the applicable amounts.

Claims Processing

Figure 5:
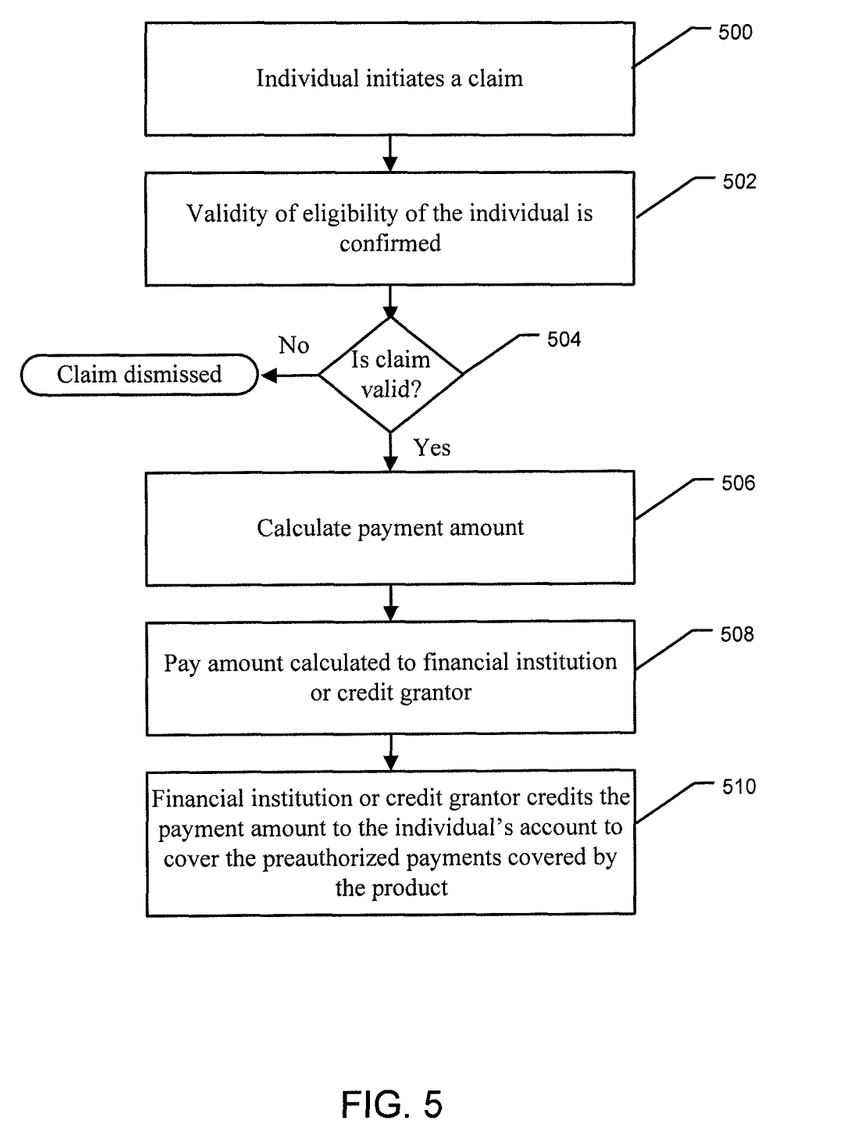
FIG. 5 illustrates an example of a process for claims processing according to an example embodiment.

In an example embodiment, the individual may initiate a claim in response to the occurrence of a covered event. FIG. 5 illustrates an example of a process for claims processing according to an example embodiment. As shown in FIG. 5, the individual may initiate a claim at operation 500 by calling a claims hotline or other claims intake number associated with an insurance company providing the insurance for the product. At operation 502, the validity of eligibility of the individual may be confirmed. At operation 504, if the claim is invalid, it may be dismissed. However, if the claim is valid, it may be passed on for further processing. At operation 506, a payment amount may be calculated. In some cases, the payment amount may be calculated as a three month average payment. The repayment amount calculated may then be paid directly to the financial institution at operation 508 so that the financial institution can credit the payment amount to the individual's account to cover the preauthorized payments covered by the product at operation 510.

It should be understood that various portions (if not all) of the operations described above (and other operations described herein) may be performed, for example, via the Plan Implementation System 300. It should be further understood that particular example embodiments of the invention may include a combination of any one or all of the embodiments described above, or various other embodiments.

Additional Features of Various Embodiments

In some embodiments, the computer system tracks various components of the program so as to separate the component parts into their appropriate regulatory components such as the offering of a credit facility and insurance for various purposes including compliance with various, local, state or provincial, and national or federal laws.

For example, some embodiments may track information relating to regulatory compliance with the Insurance Business Regulations of the Financial institution Act and in accordance with Canadian Payment Association rules regarding such laws (debits could be for any sort of recurring charge i.e. mortgage, utilities, car payment etc.).

In an example embodiment, the individual may be able to select the amount of coverage they desire to receive in any given month. In one example, an individual may be given the option to specify their benefit coverage amount or cover all tagged recurring preauthorized payments. In another example, the individual is given the option to select specific bill payments that will be used to determine the appropriate benefit amount.

Exemplary Software Modules

In particular embodiments, the functionality described above is executed by a computer system running the various exemplary software modules described below. It should be understood that these modules are exemplary, and that other types of software modules could be used in alternative embodiments. Moreover, these modules may correspond to, be in addition to, or be portions of the modules described above in connection with FIG. 2.

Individual Enrollment Module: In an example embodiment, the individual enrollment module may be configured to present individuals with options to: (1) assess their needs in relation to the program (e.g., how much coverage they will require based upon their current or projected preauthorized recurring expenditures); (2) select the appropriate coverage selections to meet those needs; and (3) determine the premium fee (i.e. providing an outline or example of expected premium charges on a monthly basis, based on projected preauthorized expenditures).

Preauthorized Payment Tracking Module: In an example embodiment, the financial institution may assign a product code to all new enrolled individuals. In various embodiments, the preauthorized payment tracking module may be configured to assign a unique code (e.g. a transaction code, or ID Code) to tag and track each pre-authorized transaction for funding and settlement.

Premium Calculation Module: In an example embodiment, the premium calculation module may be configured to capture the individual's preauthorized monthly insurance premium fees. In other embodiments, the premium calculation module may be configured to receive detailed information from the financial institution regarding the individual's monthly preauthorized recurring payment commitments.

Benefit Tracking Module: In particular embodiments, the benefit tracking module may be configured to track the benefit distribution expected to be paid on behalf of the individual to the financial institution over a predefined period of time (e.g., a maximum of 6 (six) months). In various embodiments, the benefit tracking module may be configured to calculate total benefits paid by the insurance company to the financial institution on behalf of the individual, on a monthly basis.

Exemplary Hardware

In an example embodiment, the exemplary modules described above may be embodied via instructions stored in one or more non-transitory storage mediums (e.g., memory 66) for execution via one or more processors (e.g., processor 60). The processor 60 may be embodied in a number of different ways. For example, the processor 60 may be embodied as one or more of various hardware processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 60 may be configured to execute instructions stored in the memory 66 or otherwise accessible to the processor 60. By executing stored instructions or operating in accordance with hard coded instructions, the processor 60 may control the operation of the modules described herein by directing functionality of the corresponding modules associated with implementing product setup and administration as described above according to the respective configuration provided to the corresponding modules by the processor 60 and/or the instructions stored in memory for configuring the processor 60. As such, whether configured by hardware or software methods, or by a combination thereof, the processor 60 may represent an entity capable of performing operations according to embodiments of the present invention while configured accordingly. Moreover, the configuration of the processor 60 to perform the corresponding operations described herein thereby specifically configures the processor 60 to function as a particular machine designed to perform the corresponding operations.

Figure 6:
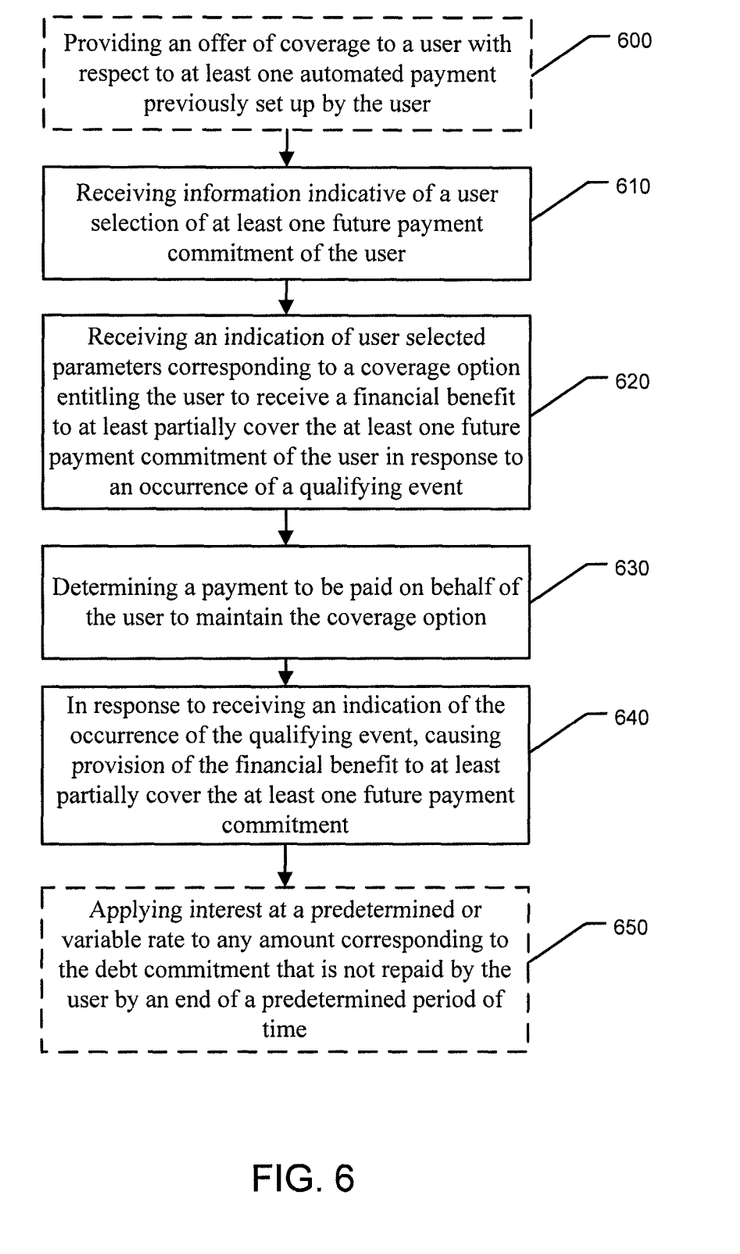
FIG. 6 is a flow chart illustrating a method for providing a credit facility to at least partially cover or fund preauthorized charges according to an example embodiment.

FIG. 6 is a flowchart of a system, method and program product according to some example embodiments. It will be understood that each block or operation of the flowchart, and combinations of blocks in the flowchart, can be implemented by various means, such as hardware, firmware, and/or software including one or more computer program instructions. For example, one or more of the procedures described above may be embodied by computer program instructions. In this regard, in an example embodiment, the computer program instructions which embody the procedures described above are stored by a memory device and executed by a processor or controller. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or operation(s). In some embodiments, the computer program instructions are stored in a non-transitory computer-readable memory that can direct a computer or other programmable apparatus to function in a particular manner, such that the instructions stored in the computer-readable memory produce an article of manufacture including instruction means which implement the function specified in the flowchart block(s) or operation(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide steps for implementing the functions specified in the flowchart block(s) or operation(s).

Accordingly, blocks or operations of the flowchart support combinations of means for performing the specified functions, combinations of operations for performing the specified functions and program instruction means for performing the specified functions. It will also be understood that one or more blocks or operations of the flowchart, and combinations of blocks or operations in the flowchart, can be implemented by special purpose hardware-based computer systems which perform the specified functions or operations, or combinations of special purpose hardware and computer instructions.

One example of a method for providing an insurance product of an example embodiment as provided in FIG. 6 may include receiving information indicative of a user selection of at least one future payment commitment of the user at operation 610 and receiving an indication of user selected parameters corresponding to a coverage option (e.g., a policy) entitling the user to receive a financial benefit to fund or cover (at least partially) the at least one future payment commitment of the user (e.g., in a lump sum, in a predetermined number of installments or for a predefined period of time) in response to an occurrence of a qualifying event at operation 620. The method may further include determining (e.g., via a processor) a payment to be paid on behalf of the user to maintain the coverage option at operation 630 and, in response to receiving an indication of the occurrence of the qualifying event, causing provision of the financial benefit to fund or cover the at least one future payment commitment at operation 640.

In some embodiments, certain ones of the operations above may be modified or further amplified as described below. Moreover, in some cases, embodiments may include additional operations (some examples of which are shown in dashed lines in FIG. 6). It should be appreciated that each of the modifications, additions or amplifications below may be included with the operations above either alone or in combination with any others among the features described herein. In an example embodiment, the method may further include providing an offer of coverage to the user with respect to at least one automated payment previously set up by the user at operation 600. The offer of coverage may be provided from a financial institution or credit facility issuer associated with an account from which payment is drawn to fund or cover the at least one automated payment. In such an example, receiving information indicative of the user selection and receiving the indication of the user selected parameters may each be performed responsive to the offer of coverage to the user. The account may be, for example, a bank account, line of credit, revolving loan account or a credit card account. In some embodiments, the method may further include applying interest at a variable or predetermined rate to any amount corresponding to the debt commitment that is not repaid by the user by an end of a predetermined period of time at operation 650. In some embodiments, determining the payment to be paid on behalf of the user to maintain the coverage option may include establishing a credit facility defining a debt commitment on behalf of the user for covering the at least one future payment commitment by a financial institution or credit facility issuer on a recurring basis prior to the occurrence of the qualifying event, and determining an amount of premium to be paid based on a period of coverage for payment of the at least one future payment commitment and an amount of the at least one future payment commitment. In an example embodiment, receiving information indicative of the user selection and receiving the indication of the user selected parameters may each be performed responsive to user inputs received via a network such as the Internet or via a bank terminal (e.g., an ATM, a point of sale terminal or other bank terminal). In some examples, receiving information indicative of the user selection may include receiving information tagging specific preauthorized payments defining the future payment commitment, or receiving a selection for a fixed coverage option.

EXAMPLES

As noted above, in various embodiments, the individual pays premium for an insurance certificate for a specified or fluctuating benefit stream in the event that the individual experiences a covered loss specified in the certificate. In particular embodiments, during the claims period the individual may pay no interest relating to the credit facility established by the financial institution. The insurance provider will cover any interest payments, if applicable.

In particular embodiments, the system tracks each monthly payout and the insurance provider may take on the responsibility to ensure that all monies are credited to the financial institution on behalf of the individual. The financial institution will take on the responsibility to ensure that each transaction is documented and reflected on the individual's monthly card or account statement.

Some examples are provided below to illustrate some exemplary embodiments. It should be appreciated that the examples may be carried out by or facilitated by the system 5 described above.

Example 1

As a first example, an individual may elect to purchase coverage that promises to distribute $1,000 to the individual if the individual is involuntarily unemployed, becomes disabled or is hospitalized and to continue such distributions on a monthly basis for a period of up to 6 months (or other pre-determined duration of time). That is, coverage options are available in bands; for example: $1-$499, $500-$999, $1,000-$1,499, and $1,500-$2,000. As part of the process of purchasing the product, the individual may have the option to select (tag) the specific preauthorized payments that the individual has elected to protect against a covered loss.

In this example, the amount to be distributed is selected by the individual at the time of enrollment and is used to determine the maximum amount of coverage and or the specific preauthorized payment commitments the individual has elected to cover, including the projected monthly premium fees.

Example 2

In another example embodiment, the individual agrees to pay a premium fee for insurance coverage in which the insurance provider, with assistance from the financial institution, agrees to identify all preauthorized payments, pay those recurring payment commitments and credit the individual's credit facility (e.g., account or credit card) for the various prepaid amounts. In particular embodiments, the insurance provider also agrees to pay all of the preauthorized payments flowing through the individual credit facility (e.g., financial account or credit card). In various embodiments, the insurance provider establishes a direct relationship with the financial institution for them to create a credit facility for the individual, and to pre-fund the individual's preauthorized payment commitments.

For example, if the individual becomes disabled and is unable to work for two months, the insurance provider may extend its guarantee to the financial institution for the two month period to distribute payments based on the individual's preauthorized payment commitments at date of loss (calculations may be obtained using data from the individual's previous month statement to calculate the value of the benefit at date of loss).

Example 3

In this example, the individual pre-selects which preauthorized payment commitment they elect to cover at time of enrollment. The financial institution will agree to secure a credit facility on behalf of the individual to pre-pay each selected preauthorized payment commitment. The insurance provider promises to repay the entire amount due of each selected preauthorized recurring payment commitment to the financial institution in the event of a qualified loss.

In this example, the financial institution agrees to track each selected preauthorized payment commitment the individual has elected to cover at time of enrollment. In the event the individual becomes disabled, hospitalized or loses employment, the individual is required to provide proof of claim, as required by the insurance provider to support the claims validation process. The insurance provider adjudicates and pays all approved claims.

Example 4

In another embodiment, the system is configured to allow individuals to select the coverage options based on their needs. As part of this process, the individual will have the option to select and tag specific preauthorized payment commitment as part of a self enrollment process. In one embodiment, the system is configured to allow the individual to self enroll in the program via a graphical user interface on a web site. On the web site, the individual may be given the option to:
 (a) select one coverage option, based on a list;
 (b) tag specific preauthorized payment commitments—or the option to data enter in each preauthorized payment commitment they have elected to cover; and/or
 (c) select a predefined insurance coverage package or build their own based on coverage options available at time of enrollment.

For example, via the website, the individual may be asked to input how much coverage is desired. If the individual input $1,000 per month, then the system may ask the individual to specify or tag the preauthorized payment commitments they would like to cover. The individual has the option to enter in the information or select the preauthorized payments from a pre-populated list. The site will then prompt the individual to set up the credit facility (e.g. a checking account or a credit card).

In another embodiment, the system asks the individual to enter in the desired benefit amount required and or target monthly premium. The system then calculates various coverage options. The individual may select the option that best meet their needs and enroll in the program.

Example 5

In still another example embodiment, the system is configured to market availability of the preauthorized payment insurance product to the individual based on user activity or other information about the user. For example, if the individual has automatic payment authorizations on record with the financial institution to fund or cover certain monthly bills, the financial institution may offer a product according to an example embodiment to the individual. In some cases, the financial institution (e.g., using system 5 or more specifically processor 60) may determine the known automatic payment authorizations of the individual, or the financial institution may determine routine monthly payment activity of the user based on account transactions (e.g., of a credit card or checking account), and the financial institution may identify the corresponding apparent bills of the individual and provide an offer to the individual for insuring payment of these apparent bills in the event of a specific loss. The offer may be merely a general notification of the availability of a product of an example embodiment. However, in some cases, the offer may include estimates on coverage parameters and corresponding premium amounts that may be expected if the individual applies for the insurance product. The individual may then examine the offer and decide whether or not to apply for the insurance product as described herein.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

I claim:

1. A method comprising:
receiving information indicative of a user selection of at least one future payment commitment of the user;
receiving an indication of user selected parameters corresponding to a coverage option entitling the user to receive a financial benefit to at least partially cover the at least one future payment commitment of the user in response to an occurrence of a qualifying event;
establishing, using a processor, a credit facility on behalf of the user for covering the at least one future payment commitment;
determining a payment to be paid on behalf of the user to maintain the coverage option; and
in response to receiving an indication of the occurrence of the qualifying event, causing provision of the financial benefit to the credit facility to cover at least part of the at least one future payment commitment.

2. The method of claim 1, further comprising providing an offer of coverage to the user with respect to at least one automated payment previously set up by the user, the offer of coverage being provided from a credit facility issuer associated with the credit facility from which payment is drawn to cover the at least one automated payment.

3. The method of claim 2, wherein receiving information indicative of the user selection and receiving the indication of the user selected coverage option parameters are each performed responsive to the provision of the offer of coverage to the user.

4. The method of claim 2, wherein the credit facility is a bank account, line of credit, revolving loan account or a credit card account.

5. The method of claim 1, wherein determining the payment to be paid on behalf of the user to maintain the coverage option comprises
determining an amount to be paid based on a period of coverage for payment of the at least one future payment commitment and an amount of the at least one future payment commitment, and
wherein the credit facility is established by a credit facility issuer to cover the at least one future payment commitment on a recurring basis prior to the occurrence of the qualifying event.

6. The method of claim 1, wherein receiving information indicative of the user selection and receiving the indication of the user selected parameters are each performed responsive to user inputs received via a network.

7. The method of claim 6, wherein receiving information indicative of the user selection and receiving the indication of the user selected parameters are each performed responsive to user inputs received via the Internet or communicated via a bank terminal.

8. The method of claim 1, wherein receiving information indicative of the user selection comprises receiving information tagging specific preauthorized payments defining the future payment commitment.

9. The method of claim 1, wherein receiving information indicative of the user selection comprises receiving a selection for a fixed or variable coverage option.

10. The method of claim 5, further comprising applying interest at a predetermined or variable rate to any amount corresponding to a debt commitment defined by the credit facility when the debt commitment is not repaid by the user by an end of a predetermined period of time.

11. An apparatus comprising a processor and non-transitory memory storing instructions, the instructions, responsive to execution, configuring the processor to cause the apparatus at least to perform:
receiving information indicative of a user selection of at least one future payment commitment of the user;
receiving an indication of user selected parameters corresponding to a coverage option entitling the user to receive a financial benefit to at least partially cover the at least one future payment commitment of the user in response to an occurrence of a qualifying event;
establishing a credit facility on behalf of the user for covering the at least one future payment commitment;
determining a payment to be paid on behalf of the user to maintain the coverage option; and
in response to receiving an indication of the occurrence of the qualifying event, causing provision of the financial benefit to the credit facility to cover at least part of the at least one future payment commitment.

12. The apparatus of claim 11, wherein the instructions further configure the processor to cause the apparatus to perform providing an offer of coverage to the user with respect to at least one automated payment previously set up by the user, the offer of coverage being provided from a credit facility issuer associated with the credit facility from which payment is drawn to at least partially cover the at least one automated payment.

13. The apparatus of claim 12, wherein receiving information indicative of the user selection and receiving the indication of the user selected parameters are each performed responsive to the offer of coverage to the user.

14. The apparatus of claim 12, wherein the credit facility is a bank account, a line of credit, revolving loan account or a credit card account.

15. The apparatus of claim 11, wherein the instructions configure the processor to cause the apparatus to determine the payment to be paid on behalf of the user to maintain the coverage option by
- determining an amount to be paid based on a period of coverage for payment of the at least one future payment commitment and an amount of the at least one future payment commitment; and
- wherein the credit facility is established by a credit facility issuer to cover the at least one future payment commitment on a recurring basis prior to the occurrence of the qualifying event.

16. The apparatus of claim 11, wherein receiving information indicative of the user selection and receiving the indication of the user selected parameters are each performed responsive to user inputs received via a network.

17. The apparatus of claim 16, wherein receiving information indicative of the user selection and receiving the indication of the user selected parameters are each performed responsive to user selections received via the Internet or communicated via a bank terminal.

18. The apparatus of claim 11, wherein the instructions configure the processor to cause the apparatus to receive information indicative of the user selection by receiving information tagging specific preauthorized payments defining the future payment commitment.

19. The apparatus of claim 11, wherein the instructions configure the processor to cause the apparatus to receive information indicative of the user selection by receiving a selection for a fixed or variable coverage option.

20. The apparatus of claim 11, wherein the instructions further configure the processor to cause the apparatus to perform applying interest at a predetermined or variable rate to any amount corresponding to a debt commitment associated with the credit facility when the debt commitment is not repaid by the user by an end of a predetermined period of time.

21. The method of claim 1, wherein the at least one future payment commitment comprises a credit card payment, an automobile payment, a mortgage, or a utility bill.

22. The method of claim 1, wherein the at least one qualifying event comprises hospitalization of a specified individual, disability of the specified individual, or unemployment of the specified individual.

* * * * *